F. W. ETHRIDGE.
AUTOMOBILE SIGNAL.
APPLICATION FILED SEPT. 12, 1917.
1,264,038.
Patented Apr. 23, 1918.
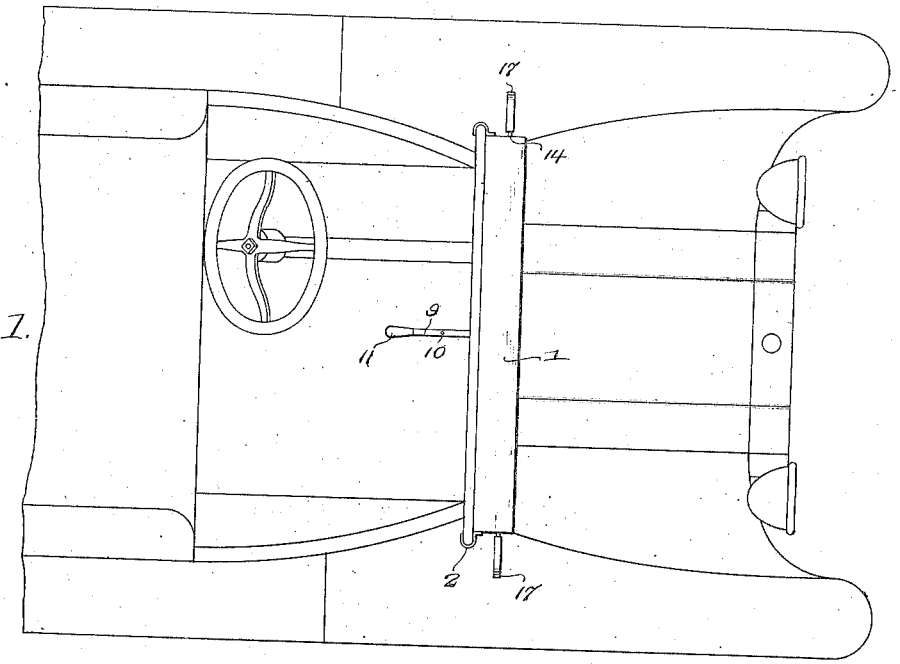
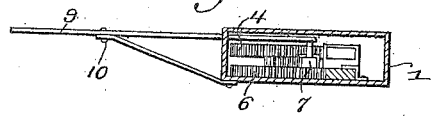
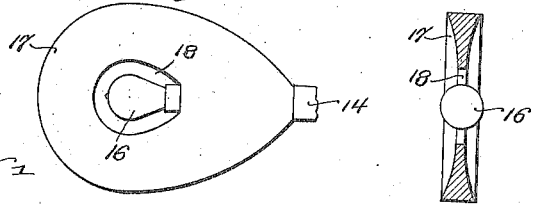
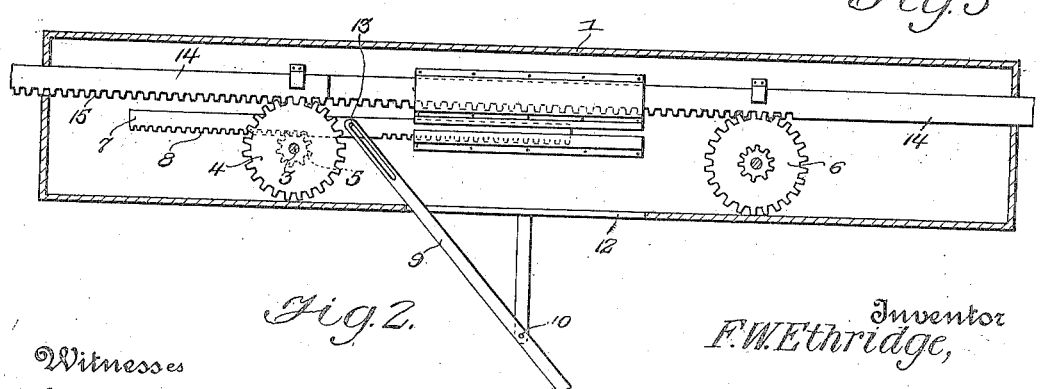
Inventor
F. W. Ethridge,
By Victor J. Evans
Attorney
Witnesses
J. H. Crawford

UNITED STATES PATENT OFFICE.

FRANK W. ETHRIDGE, OF TULSA, OKLAHOMA.

AUTOMOBILE-SIGNAL.

1,264,038. Specification of Letters Patent. Patented Apr. 23, 1918.

Application filed September 12, 1917. Serial No. 191,044.

*To all whom it may concern:*

Be it known that I, FRANK W. ETHRIDGE, a citizen of the United States, residing at Tulsa, in the county of Tulsa and State of Oklahoma, have invented new and useful Improvements in Automobile-Signals, of which the following is a specification.

This invention relates to new and useful improvements in automobile attachments, and the principal object of the invention is to provide means for indicating to the driver of the vehicle in the rear or front the intentions of the driver to turn the automobile either to the right or to the left.

Another object of the invention is to provide a device of this character which may be readily applied to motor vehicles of any type and one which may be attached to existing models with but little change thereto.

Among other features the invention consists of a pair of arms adapted to be secured to the wind shield of the automobile with means for reciprocating one of said arms to extend the same to one side of the automobile and the other arm to the opposite side thereof.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 shows the invention applied to an automobile,

Fig. 2 is a front view of one of the arms in extended position,

Fig. 3 is an end view with the casing removed, and

Fig. 4 is a detail view.

Fig. 5 is a transverse section through Fig. 4.

In the drawings 1 indicates a casing which is adapted to be secured to the wind shield by the adjustable clamps 2. 3 indicates a stub shaft mounted in the casing and carrying a large cog wheel 4 and a small cog wheel 5. As will be seen the small wheel is arranged concentrically relative to the large wheel. A like arrangement of wheels is located adjacent the other end of the casing, as indicated at 6, the said combination of wheels being located approximately midway the center of the casing at its ends. As will be seen from Fig. 3 the two large wheels are oppositely arranged while the two smaller wheels are located in the same plane. A bar 7 having each end provided with ratchet teeth 8 is arranged to reciprocate in guides carried by the casing and the teeth 8 are adapted to engage with the smaller cog wheels 5. A lever 9 pivoted, as at 10, to the dash and provided with a handle 11, is arranged with a slot 12 at its upper end, which end extends into the casing and the pin 13 on the lever 7 engages with this slot. When the lever 9 is in vertical position the extreme ends of the bar 7 will be in engagement with both of the smaller cogs 5. When the lever is swung from vertical position, as shown in Fig. 2, the bar 7 will be reciprocated so that its teeth engaging with the smaller cog wheel will cause said wheel to revolve, thus causing the larger cog wheel to also revolve. It will be understood that the lever 9 can be swung in either direction so as to revolve either one set of cog wheels or the other.

14 designates a pair of arms, one projecting from one end of the casing and one from the other. Each of these arms is supported in guides in the casing and on its underside it is provided with ratchet teeth 15, which extend from the inner end to a point beyond the center of said arm. Each of these arms is so located that the teeth will engage with the large cog wheel so that the rotation of said cog wheel will reciprocate the arm. I prefer to arrange the arms above the cog wheel so that the teeth in the enlarged side of the arms will engage with the upper part of the wheels. Each arm at its outer end carries an electric light 16, and a combined shield and reflector 17. This reflector is provided with an opening 18 which surrounds the electric light bulb and said shield is provided with concaved faces to provide reflecting surfaces for the light. The wires for the bulb are attached to the arm in any suitable manner and the said wires lead to any suitable source of electric supply.

When the automobile is running straight ahead the operating lever 9 is in its vertical position and both the arms are in their innermost position so that the signals cannot be seen from the rear. When the driver swings the lever toward the right the bar 7 rotates the left hand set of cogs, and causes the arm 14 to slide outwardly thus exposing the signal to notify the automobiles following that he is to turn to the left. When the driver wishes to turn to the right he moves the lever toward the left so that the right hand arm is operated as before. It will be understood that the signal can also be seen from a car approaching from the front.

It will be understood that the signals can be seen from the front as well as from the rear so that a car approaching the automobile provided with my signals will be notified that the automobile is about to make a turn.

I prefer to attach the lights of my signals to the lighting system of the car in such a manner that when the head lights are turned on the lights of the signal will also be turned on, though these lights are so arranged that they are not lighted until they are moved into operative position.

It is thought from the foregoing that the advantages and novel features of my invention will be readily apparent.

I desire it to be understood that I may make slight changes in the construction and in the combination and arrangement of the several parts, provided that such changes fall within the scope of the appended claim.

I claim as my invention:

A device of the class described comprising a casing, guides located centrally therein, a pair of arms slidably mounted in said casing and extending from the ends thereof and having their inner ends engaging said guides, ratchet teeth on said arms, a large toothed wheel on each side of the guides and engaging said teeth, a small toothed wheel connected to each of the aforementioned wheels, said small wheels being in the same longitudinal plane, a bar having ratchet teeth thereon supported in one of the guides and engaging the small wheels, a pin on said bar and an operating lever having a slot therein engaging the pin for reciprocating said bar to rotate the wheels.

In testimony whereof I affix my signature.

FRANK W. ETHRIDGE.